US006714161B2

(12) United States Patent
Spratt

(10) Patent No.: US 6,714,161 B2
(45) Date of Patent: Mar. 30, 2004

(54) LOCATION DETERMINATION USING LOCATION DATA ITEMS RECEIVED BY SHORT-RANGE COMMUNICATION

(75) Inventor: Michael P Spratt, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/162,037

(22) Filed: Jun. 3, 2002

(65) Prior Publication Data

US 2002/0186166 A1 Dec. 12, 2002

(30) Foreign Application Priority Data

Jun. 11, 2001 (GB) ............................................. 0114144
Jul. 20, 2001 (GB) ............................................. 0117704

(51) Int. Cl.$^7$ ................................................ G01S 3/02
(52) U.S. Cl. ...................................... 342/464; 342/463
(58) Field of Search ................................ 342/450, 457, 342/463, 464; 455/456.1, 456.3, 457

(56) References Cited

U.S. PATENT DOCUMENTS

| | | | | |
|---|---|---|---|---|
| 3,715,758 A | * | 2/1973 | Sender | 343/112 R |
| 4,636,795 A | | 1/1987 | Dano | 342/387 |
| 4,703,444 A | * | 10/1987 | Storms et al. | 364/561 |
| 5,428,544 A | | 6/1995 | Shyu | 364/436 |
| 5,663,990 A | | 9/1997 | Bolgiano et al. | 375/347 |
| 5,917,449 A | | 6/1999 | Sanderford et al. | 342/457 |
| 5,982,324 A | | 11/1999 | Watters et al. | 342/357.06 |
| 6,054,950 A | * | 4/2000 | Fontana | 342/463 |
| 6,084,547 A | | 7/2000 | Sanderford et al. | 342/457 |
| 6,097,336 A | * | 8/2000 | Stilp | 342/357.02 |

FOREIGN PATENT DOCUMENTS

| | | |
|---|---|---|
| DE | 36 33 557 A1 | 4/1987 |
| DE | 199 03 909 A1 | 3/2000 |
| DE | 199 03 909 A1 | 8/2000 |
| EP | 0 341 738 A2 | 11/1989 |
| EP | 0 948 222 | 10/1999 |
| EP | 1 030 531 A1 | 8/2000 |
| EP | 1 133 115 | 9/2001 |
| EP | 1 174 728 | 1/2002 |
| GB | 2338374 | 12/1999 |
| GB | 2354386 | 3/2001 |
| JP | 2001-116820 | 4/2001 |
| WO | 99/65152 | 12/1999 |
| WO | 01/10154 A1 | 2/2001 |
| WO | 01/10154 | 2/2001 |
| WO | 01/27649 A1 | 4/2001 |

OTHER PUBLICATIONS

Abstract of JP 2001–116820, published Sep. 1999, Derwent, 1 page.

Savarese, C., et al., "Locationing in Distributed Ad–Hoc Wireless Sensor Networks," *2001 IEEE International Conference on Acoustics, Speech, and Signal Processing*, vol. 4 of 6, pp. 2037–2040 (May 7, 2001).

* cited by examiner

Primary Examiner—Dao Phan

(57) ABSTRACT

A location determination method uses location data items that originate at known locations and are passed to, and diffused between, entities by short-range communication. Each location data item received by an entity includes a displacement value indicative of the displacement of the item since leaving a specified known location. This displacement value of a location data item has been updated to reflect movement of entities temporarily hosting the item and/or the range of the transmission hops made by the item. An entity derives its location from received location data items by effecting a weighted combination of the known locations specified in the received location data items, the weighting of the known location specified in each received location data item being dependent on the associated displacement value.

17 Claims, 2 Drawing Sheets

LOCATION DETERMINATION USING LOCATION DATA ITEMS RECEIVED BY SHORT-RANGE COMMUNICATION

FIELD OF THE INVENTION

The present invention relates to location determination and, in particular, to location determination by an entity in an environment in which multiple items of location data are diffused to and between entities by short-range communication.

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

FIG. 1 of the accompanying drawings depicts an information diffusion process in which an originating information point 10 (typically fixed, but not necessarily so) sends out the information over a short-range radio link to nearby mobile devices, in this case device 11. The receiving device 11 transmits on the information to a neighboring device 12 and then moves (see dashed arrow in FIG. 1) before sending on the information again to another device 14. Meanwhile mobile device 12 has moved into proximity with device 13 to which it also transmit the information. Device 13 now moves near to the device 14 and passes the latter the information—however, as device 14 already has the information from device 11, it ignores the copy from device 13. Device 13 also passes the information to a fixed relay transceiver which subsequently passes the information to a mobile device 15. Finally, device 15 passes the information to device 14 which has now within range of device 15; again, device 14 ignores the copy information from device 15.

It can be seen that information can be rapidly diffused among the population of mobile-device users in the general vicinity of the source 10. So, the process of diffusion takes advantage of both the short range wireless technology and the movement of the users carrying the devices.

By applying appropriate diffusion-limiting mechanisms (for example, by assigning the original information a total time to live of, for example, 10 minutes), the information can be restricted to the vicinity of the originating point 10. This makes the diffusion process appropriate for the diffusion of location relevant information that is primarily of use only in the vicinity of point 10.

The diffused information can, of course, include the location of the originating point. For devices receiving the information directly from the originating point, this provides them with a fairly accurate indication of their location (because the information is received over a short-range link). However, as the information is diffused between devices, the newly-receiving devices get less and less accurate location information.

Our European Application EP-A-1 133 115 describes a method by which an entity receiving location data by diffusion from several different sources, can use this data to estimate its current position in dependence on the relative prominence of the sources.

Our co-pending European Application EP-A-1 174 728 describes another method by which an entity can discover its location using multiple items of location data received by short-range diffusion from several sources. In this method, each location data item includes an indication of the distance traveled by the location data item from its source, either by displacement of entities temporarily holding the item or by transmission. This distance represents an upper bound on the current distance of a receiving entity from the source concerned and this can be used, together with upper-bound distances from other sources, to discover a current zone where the entity is likely to be located; various averaging techniques can then be applied to derive a current location for the entity.

This latter method can involve significant processing of the received location data which may not always be desirable.

It is an object of the present invention to provide a location discovery method and apparatus that uses location data items including both source-location and distance-from-source data which, at least in certain embodiments, involves reduced processing of the location data.

SUMMARY OF THE INVENTION

According to one aspect of the present invention, there is provided a location determination method wherein an entity receives, by short-range communication, location data items originating at known locations, each location data item including a displacement value indicative of the displacement of the item since leaving a specified said known location; the entity deriving its location from location data items it has received by effecting a weighted combination of the known locations specified in the received location data items, the weighting of the known location specified in each received location data item being dependent on the associated displacement value.

According to another aspect of the present invention, there is provided a location determination method wherein location data items originating at known locations are passed to, and diffused between, entities by short-range communication, each location data item received by an entity indicating a separation distance of the entity from a specified said known location; a said entity deriving its location from location data items it has received by combining the known locations specified in the location data items in dependence on the related separation distances and/or the ages of the location data items.

According to a further aspect of the present invention, there is provided a mobile entity provided with a location determination system comprising:

a short-range receiver for receiving location data items from currently nearby transmitting entities, each location data item indicating a displacement value of the entity from a specified known location;

a memory for storing the received data items;

a distance sub-system for measuring or estimating the distance travelled by the mobile entity;

an update arrangement for updating the received data items by increasing the displacement value associated with each data item by the distance measured or estimated by the distance sub-system since the item concerned was received or last updated; and a location derivation arrangement operative to determine the location of the entity by effecting a weighted combination of the known locations specified in the received location data items, the weighting of the known location specified in each received location data item being dependent on the associated displacement value.

According to a still further aspect of the present invention, there is provided a mobile entity provided with a location determination system comprising:

a short-range receiver for receiving location data items from currently nearby transmitting entities, each location data item indicating a displacement value of the entity from a specified known location;

a memory for storing the received data items;

a distance sub-system for measuring or estimating the distance travelled by the mobile entity;

an update arrangement for updating the received data items by increasing the displacement value associated with each data item by the distance measured or estimated by the distance sub-system since the item concerned was received or last updated; and a location derivation arrangement operative to determine the location of the entity by effecting a weighted combination of the known locations specified in the received location data items, the weighting of the known location specified in each received location data item being dependent on the associated displacement value.

BRIEF DESCRIPTION OF THE DRAWINGS

Location discovery methods and entities implementing these methods, all embodying the invention, will now be described, by way of non-limiting example, with reference to the accompanying diagrammatic drawings, in which.

BEST MODE OF CARRYING OUT THE INVENTION

Figure 1:
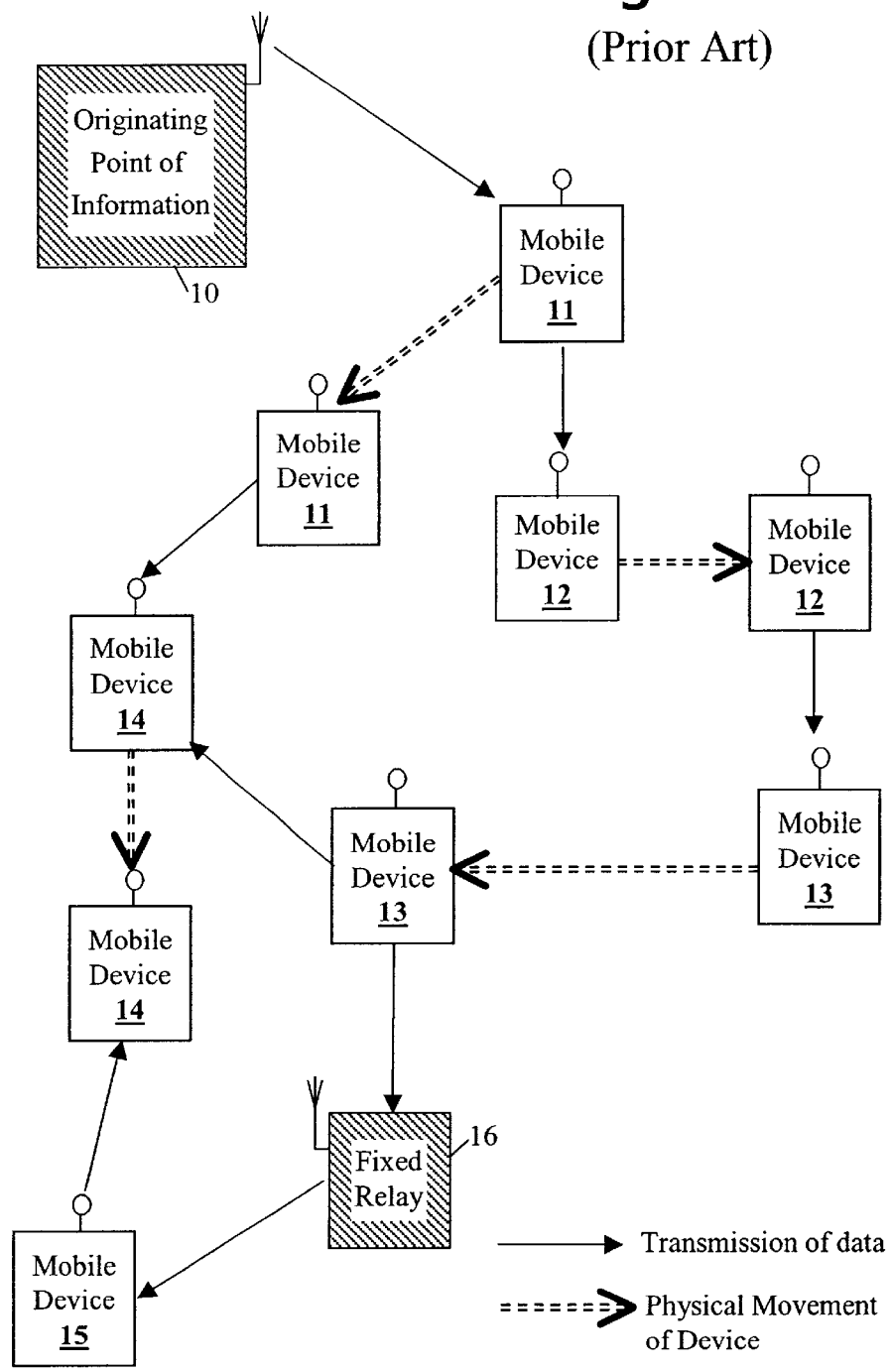
FIG. 1 is a diagram illustrating a known information diffusion technique.
Figure 2:
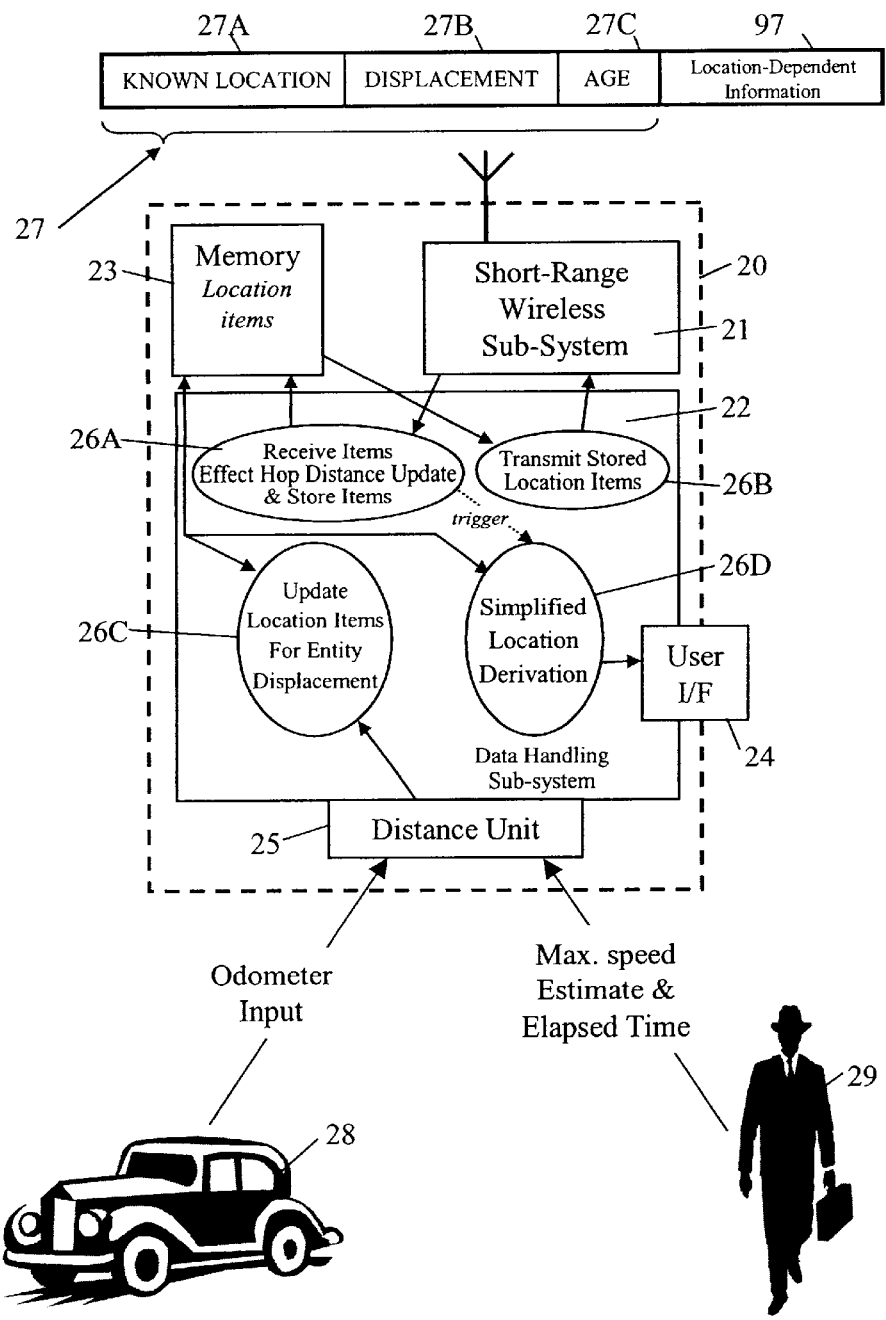
FIG. 2 is a diagram illustrating the main elements of a generalised entity embodying the present invention.

FIG. 2 shows the main elements of a generalized entity 20 embodying the present invention. Specific implementations of the generalized entity include a vehicle-based implementation, a pedestrian-based implementation, and a static-device based implementation. In the case of the vehicle-based implementation, the functional elements can be built into the vehicle whereas in the case of the pedestrian-based implementation, the elements will generally be provided in the form of a mobile device carried by the pedestrian. Not all of the illustrated elements are required in all implementations—for example, for static devices, distance unit 25 (to be described below) is not required. Similarly, the functionality provided by data handling subsystem 22 will generally differ between implementations as may the types of data stored.

The functional elements of the entity 20 comprise:

a short-range wireless transceiver subsystem 21 (for example, infrared-based or, preferably, radio-based such as a Bluetooth system) for receiving and (preferably) transmitting location data items 27 from/to nearby entities of similar form;

a data-handling subsystem 22 for handling and maintaining the location data items 27 and effecting location determinations;

a memory 23 for storing map data and location data items 27 received via the wireless subsystem 21 and the data-handling subsystem 22;

a user interface 24 for displaying a map-based indication of location to the user; and a distance unit 25 for providing to the data-handling subsystem 22, in cases where the entity 20 is a mobile entity, a measure of incremental distance traveled by the entity.

The data-handling subsystem runs four main processes, these being a process 26A for receiving, updating and storing location data items; a process 26B for controlling the onward transmission of location data items whenever the wireless subsystem 21 determines that there is another entity close by; a process 26C (only required for mobile entities) for updating the stored location data items to take account of the incremental distance traveled by the entity according to the distance unit 25; and a process 26D for effecting location determination based on the received location data items (and possibly also the map data held in memory 23), and for outputting the results of the determination to user interface 24.

Each location data item comprises two main fields 27A and 27B. Field 27A holds an identifier specifying a known location, either as a label which can be used to look up the location (for example, using the map data held in memory 23), or directly as location coordinates for the location. Field 27B holds a distance quantity which, as will be more fully explained below, represents the displacement of the location data item since leaving its point of origin and thus corresponds to the maximum distance to the known location identified by field 27A. The location data item may also include an age field 27C indicating the age (or time to live) of the location data item as will be explained below. Each location data item originates from a short-range transmission source located at the known location specified in the data item.

Each location data item may be transmitted as the sole content of a message or may be included with other message content such as location-dependent information 97.

The distance quantity held in field 27B is arranged to be updated by the entities 20 handling the item to take account of the displacement of the item from its source. This displacement can be either as a result of movement of an entity that is temporarily holding the item or as a result of a transmission hop between entities. Whether updating of the field 27B is done to take account of one or both types of item displacement will generally depend on the nature of the entity concerned. Thus, mobile entities will generally be arranged to update the location data items they hold for item displacement due to entity movement, this being the function of distance unit 25 and process 26C; mobile entities may or may not also update location data items to take account of transmission hops depending on whether such hops are likely to contribute significantly to overall item displacement (this is potentially the case for pedestrian-based entities but unlikely for vehicle-based entities), such updating, if effected being part of process 26A. Static entities will generally only update location data items in respect of transmission hops.

As regards the distance unit 25 provided in respect of mobile entities, where the mobile entity is vehicle based (see vehicle 28), the unit 25 can conveniently be constituted by the vehicle's existing odometer; for pedestrian-based implementations (see pedestrian 29), the distance unit 25 is preferably a process run by the data handling subsystem 22 to provide an estimate of distance travelled based on the product of elapsed time (since last update or message receipt) and a maximum speed value set or measured for the pedestrian; a motion detector is preferably provided to limit the elapsed time value to periods when the pedestrian is in motion.

As already indicated, the purpose of the update process 26C is to use the output of the distance unit 25 to update the distance quantity held in field 27B of each location data item by adding to it the incremental distance travelled by the mobile entity since the last update or, for newly received items, since received. Whilst it is only necessary to update the distance quantities held in fields 27B immediately prior to the data items either being used in the location determination process 26D or being onwardly transmitted, in practice it may be more convenient to continuously update the distance quantities.

With respect to updating the distance quantity of a location data item to take account of the transmission hops between entities taking part in diffusion of the item, this can be done by increasing the value of the distance quantity 27B by a transceiver range value each time the item is transmitted. Increasing the distance quantity in this way can be effected either in the transmitting entity immediately prior to transmission or in the receiving entity upon receipt (for example, as part of process 26A). Since, of course, the range of the transmitting entity is a function not only of the transceiver of the transmitter but also of the sensitivity of the transceiver of the receiving entity, the range value added to the distance quantity 27B should be for standard receiving conditions. If this range value is added at each hop from entity to entity, the distance quantity 27B will be increased by the sum of the ranges of the participating entities. In fact, where all entities have approximately the same range, a simple implementation for taking account of the transmission hops would be to include a hop count in each location data item (as the distance quantity or a component of it); a receiving entity could then multiply this hop count by a range value to derive the actual distance quantity component arising from transmission hops.

The foregoing consideration of adding transmission hop values to the distance quantity 27B, effectively assumes that all entities will be receiving at the maximum range, which is unlikely to be the case. By separately specifying the range of the transmitting entity in the transmitted message (and not including it in the transmitted the distance quantity 27B), the receiving entity can choose whether to add the full range value to the received distance quantity 27B or whether only a percentage amount should be added because the receiving entity believes itself not to be at the maximum range from the transmitting entity. Such a belief can be derived from the received signal strength, a strong signal indicating that the transmitting entity is closer than if a weak signal is received.

Of course, the transmitting entity can automatically add 100% of its range to the distance quantity 27B when transmitting, the receiving entity then being responsible for subtracting an appropriate percentage of the transmitting entity's range (this range value still being included in the transmitted message).

Location Derivation

Our aforesaid European Patent Application no EP-A-1 174 728 describes a method of location derivation in which the distance quantity of each location data item 27 held by an entity is treated as providing an upper bound on the distance of the entity from the known location identified in the data item (the distance quantity is an upper bound because some of the distance travelled by the item may not have been away from the source). The entity then derives its location by determining a location simultaneously consistent, or most nearly consistent, with the upper bound values it knows of as a result of location data items it has received. In carrying out this derivation, the entity may apply one or more route constraints for how the location data items passed to the mobile entity (for example, where the entity is a vehicle, the upper bound distances are taken as being distances along roads). Of course, the upper bound distances of currently-held location data items are likely to delimit a zone where the entity is probably located rather than a single point; accordingly, the location derivation process can be arranged to effect a best estimate of location within this zone based, for example, on an averaging relative to vertices of the zone.

The foregoing location derivation process may require substantial processing resources and the present invention provides an alternative method of using the distance quantity information in the derivation of the location of an entity. Implementations of this alternative method are described below.

In general terms, an entity will have received one or more location data items LD1 to LDn each comprising the coordinates (typically x, y coordinates) of a specific known location, and a distance quantity d that is a measure or estimate of the maximum distance to the known location based on the distance traveled by carrying entities and/or the transmission hop distance each time the location data item is passed on. In other words, the entity possesses location information that can be represented as:

(d1, x1, y1); (d2, x2, y2); (d3, x3, y3); etc.

It will generally be the case that the further away a location data item is from where it was sourced, the less importance should be attached to it in the location derivation process. The simplest way of accomplishing this is to make the importance of the known location identified by a location data item proportional to the inverse of the distance quantity (1/d) of that item. A weighted average can be calculated by process 26D as follows:

$X$ coordinate of estimate of position $= K.(x1/d1 + x2/d2 + x3/d3 \ldots)$ where K is defined as $1/(1/d1 + 1/d2 + 1/d3 \ldots)$ $Y$ coordinate of estimate of position $= K.(y1/d1 + y2/d2 + y3/d3 \ldots)$ where K is again $1/(1/d1 + 1/d2 + 1/d3 \ldots)$ An alternative form of expressing this is:

$X$ coordinate of estimate of position $= K.(x1.c1 + x2.c2 + x3.c3 \ldots)$ $Y$ coordinate of estimate of position $= K.(y1.c1 + y2.c2 + y3.c3 \ldots)$ where $c_i$ is equal to $1/d_i$ and K is $1/(c1 + c2 + c3 \ldots)$ In the case where $c_1, c_2, c_3$ etc. are all the same, the above expression just leads to a straightforward average of $x_1, x_2, x_3 \ldots$ and $y_1, y_2, y_3 \ldots$ Note that in order to avoid di being zero, at least the first transmission hop should be taken account of in di (this can be guaranteed by having the short-range transmitter at each known location always include a value for d equal to the range of the transmitter).

As an alternative to weighting each coordinate value by $K/d$, a weighting factor of $K/d^2$ can advantageously be used.

For a collection of static devices, rather than using actual distance values for d, where a hop count value has been stored in field 27B, the hop count can be used for d; this assumes that hop counts are available for all location data items used in the location derivation and that the size of hop is approximately the same, at least on average.

In general, there exists a class of location estimates, where the estimate is of the form:

$X$ coordinate of location estimate=$F(d1, d2, d3, x1, x2, x3, \ldots)$ $Y$ coordinate of location estimate=$G(d1, d2, d3, y1, y2, y3, \ldots)$ where $F(\ )$ and $G(\ )$ are predetermined functions.

Even more generally:

$X$ coordinate of location estimate=$H(d1, d2, d3, \ldots, x1, x2, x3, \ldots y1, y2, y3, \ldots)$ $Y$ coordinate of location estimate=$L(d1, d2, d3, \ldots, x1, x2, x3, \ldots y1, y2, y3, \ldots)$ where $H(\ )$ and $L(\ )$ are predetermined functions.

It is also possible to further weight the coordinates of the known locations in dependence on the age of the related location data items—in particular, the weighting can be inversely proportional to age. The age of an item is its age since leaving its point of origin (that is, the associated known location). This age can be measured by including a timestamp in the field 27C of the location data item indicating when the item was first sent out; however, this timestamp is only useful if receiving entities are time synchronized to the originating entity. A more useful approach is for each entity holding the item to increase an age value held in field 27C, immediately prior to sending on the item, by an amount corresponding to the duration for which the item was held in the entity. An alternative would be for each item to have an initial time to live value set in field 27C by the originating point, this value being decreased by the holding time in each entity until the time to live expires at which time the item is discarded (or a zero weighting given to the corresponding known location in any location calculation).

Many variations are, of course, possible to the above-described embodiments of the invention. For example, the source points for location data items need not be fixed but could be mobile devices that derive their own location by some other means (such as by using a GPS system or a cellular radio network location technique).

It will be appreciated that any suitable coordinate system can be employed for specifying locations; for example a latitude/longitude based coordinate system can be used or a locally defined coordinate system (the latter potentially being more appropriate for use in an environment such as a shopping mall or theme park). Thus the weighted combination of the source locations used in deriving entity location can be effected by weighting the appropriate components according to the coordinate system being used.

The entity 20 can take any suitable form and is not restricted by the form illustrated in FIG. 2. In particular, whilst the data handling subsystem 22 is typically implemented as a program controlled processor for executing various processes, some or all of the functionality of the data handling subsystem could alternatively be effected by dedicated circuitry and, conversely, some of the functionality represented by the other elements of the entity 20 can be implemented by processes executed by the data handling subsystem 22.

What is claimed is:

1. A location determination method wherein an entity receives, by short-range communication, location data items originating at known locations, each location data item including a displacement value indicative of the displacement of the item since leaving a specified said known location; the entity deriving its location from location data items it has received by effecting a weighted combination of the known locations specified in the received location data items, the weighting of the known location specified in each received location data item being dependent on the associated displacement value.

2. A method according to claim 1, wherein the weighting of the known location specified in each received location data item is inversely related to the associated displacement value.

3. A method according to claim 1, wherein the weighting of the known location specified in each received location data item is inversely related to the square of the associated displacement value.

4. A method according to claim 1, wherein the weighting of the known location specified in each received location data item is further dependent on the age of the location data item relative to when it originated from the known location.

5. A method according to claim 1, wherein the said entity is a mobile entity which, prior to using a location data item in the derivation of its location, updates the displacement value of that item by an amount corresponding to an estimate of the distance moved by the mobile entity since receipt of the location data item.

6. A method according to claim 5, wherein the mobile entity is a vehicle equipped with a short-range transceiver and an odometer, the vehicle increasing the displacement values of its received location data items by the distance travelled by the vehicle as indicated by said odometer.

7. A method according to claim 5, wherein the mobile entity is a pedestrian carrying a mobile device with a short-range transceiver, the device effecting an estimate of the maximum distance likely to have been travelled by the pedestrian based on a speed value and elapsed time, and the device increasing the displacement values of its received location data items by said estimate of the maximum distance likely to have been travelled by the pedestrian.

8. A method according to claim 1, wherein said entity increases the displacement value of a said location data item it receives by an amount related to the range of the short range transmitter transmitting the location data item to the entity.

9. A method according to claim 1, wherein said entity, which is a mobile entity, increases the displacement value of a said location data item it handles both by an amount corresponding to the distance moved by the entity whilst holding the location data item and by an amount related to the range of the short-range transmitter transmitting the location data item to the entity.

10. A method according to claim 1, wherein the said displacement value comprises a hop count that serves as a measure of the distance travelled by the location data item concerned as a result of transmission hops.

11. A mobile entity provided with a location determination system comprising:

a short-range receiver for receiving location data items from currently nearby transmitting entities, each location data item indicating a displacement value of the entity from a specified known location;

a memory for storing the received data items;

a distance sub-system for measuring or estimating the distance travelled by the mobile entity;

an update arrangement for updating the received data items by increasing the displacement value associated with each data item by the distance measured or estimated by the distance sub-system since the item concerned was received or last updated; and a location derivation arrangement operative to determine the location of the entity by effecting a weighted combination of the known locations specified in the received location data items, the weighting of the known location specified in each received location data item being dependent on the associated displacement value.

12. An entity according to claim 11, wherein the weighting of the known location specified in each received location data item is inversely related to the associated displacement value.

13. An entity according to claim 11, wherein the weighting of the known location specified in each received location data item is inversely related to the square of the associated displacement value.

14. An entity provided with a location discovery system comprising:

a short-range receiver for receiving location data items from currently nearby transmitting entities, each location data item indicating a displacement value of the entity from a specified known location;

a memory for storing the received data items;

an update arrangement for updating the received data items by increasing the displacement value associated with each data item by an amount related to the transmission range of the transmitting entity in respect of one of receipt and transmission of the location data item by the entity; and a location derivation arrangement operative to determine the location of the entity by effecting a weighted combination of the known locations specified in the received location data items, the weighting of the known location specified in each received location data item being dependent on the associated displacement value.

15. An entity according to claim 14, wherein the weighting of the known location specified in each received location data item is inversely related to the associated displacement value.

16. An entity according to claim 14, wherein the weighting of the known location specified in each received location data item is inversely related to the square of the associated displacement value.

17. A location determination method wherein location data items originating at known locations are passed to, and diffused between, entities by short-range communication, each location data item received by an entity indicating a separation distance of the entity from a specified said known location; a said entity deriving its location from location data items it has received by combining the known locations specified in the location data items in dependence on the related separation distances.

* * * * *